US012233450B2

(12) United States Patent
Davi

(10) Patent No.: US 12,233,450 B2
(45) Date of Patent: Feb. 25, 2025

(54) METHOD AND APPARATUS FOR CONTROLLING A PROCESS FOR CURVING ELONGATED PIECES AND ROLLING CURVING MACHINE

(71) Applicant: PROMAU S.R.L., Cesena (IT)

(72) Inventor: Orazio Maria Davi, Cesena (IT)

(73) Assignee: PROMAU S.R.L. (IT)

( * ) Notice: Subject to any disclaimer, the term of this patent is extended or adjusted under 35 U.S.C. 154(b) by 935 days.

(21) Appl. No.: 17/044,378

(22) PCT Filed: Apr. 2, 2019

(86) PCT No.: PCT/IB2019/052693
§ 371 (c)(1),
(2) Date: Oct. 1, 2020

(87) PCT Pub. No.: WO2019/193497
PCT Pub. Date: Oct. 10, 2019

(65) Prior Publication Data
US 2021/0101198 A1    Apr. 8, 2021

(30) Foreign Application Priority Data
Apr. 3, 2018  (IT) .................. 102018000004183

(51) Int. Cl.
*B21D 7/12*    (2006.01)
*B21D 7/08*    (2006.01)
(Continued)

(52) U.S. Cl.
CPC ............... *B21D 7/12* (2013.01); *B21D 7/08* (2013.01); *G01B 11/24* (2013.01); *G06T 7/001* (2013.01);
(Continued)

(58) Field of Classification Search
CPC ... B21D 7/08; B21D 7/12; B21D 7/14; B21D 5/002; B21D 5/004; B21D 5/006;
(Continued)

(56) References Cited

U.S. PATENT DOCUMENTS

2013/0147093 A1    6/2013  Turanjanin
2013/0319061 A1 *  12/2013  Tofini ................. B21D 7/14
                                              72/11.1
(Continued)

FOREIGN PATENT DOCUMENTS

DE    2913318 U1        9/1997
JP    2001201790 A  *  7/2001
(Continued)

OTHER PUBLICATIONS

European Patent Office English Translation of JP-2001201790-A by Masato (Year: 2001).*

*Primary Examiner* — Christopher L Templeton
*Assistant Examiner* — P Derek Pressley
(74) *Attorney, Agent, or Firm* — LAUBSCHER & FRETWELL, P.C.

(57) ABSTRACT

A method for curving an elongated piece uses a digital system which includes a control console having a programmable processing unit and a screen for displaying data and a camera connected with the processing unit and configured and positioned for acquiring images of the elongated piece. In accordance with the method, the profile of at least one virtual template of curvature is stored in the processing unit and a real image of the elongated piece is detected. The profile of the virtual template and the real image of the elongated piece are reproduced and compared in real time. The roller curving machine is driven and the curvature and the geometric configuration of the elongated piece are matched with the profile of the virtual template of curvature.

18 Claims, 13 Drawing Sheets

(51) Int. Cl.
 *G01B 11/24* (2006.01)
 *G06T 7/00* (2017.01)
(52) U.S. Cl.
 CPC .............. *G06T 2207/30136* (2013.01); *G06T 2207/30164* (2013.01)
(58) Field of Classification Search
 CPC ........... B21D 5/14; G06T 7/001; G01B 11/24; A61B 17/8863
 See application file for complete search history.

(56) References Cited

U.S. PATENT DOCUMENTS

| | | | | |
|---|---|---|---|---|
| 2013/0345850 | A1* | 12/2013 | Frigo | B21D 5/045 700/145 |
| 2015/0347631 | A1* | 12/2015 | Dutta | G05B 19/4097 703/1 |
| 2016/0175013 | A1* | 6/2016 | Redmond | B21D 7/14 72/14.9 |
| 2017/0333968 | A1 | 11/2017 | Turanjanin | |
| 2018/0218486 | A1* | 8/2018 | Seo | G01B 11/24 |

FOREIGN PATENT DOCUMENTS

| | | | |
|---|---|---|---|
| KR | 20170013070 A | * | 2/2017 |
| WO | WO-2018054431 A1 | * | 3/2018 |

* cited by examiner

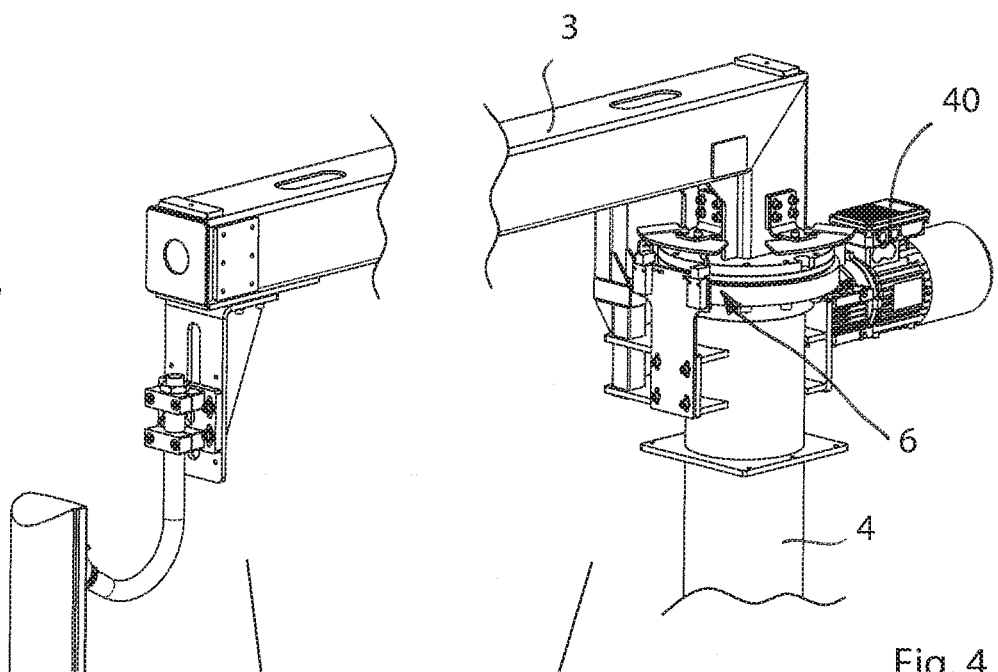
Fig. 3
Fig. 4
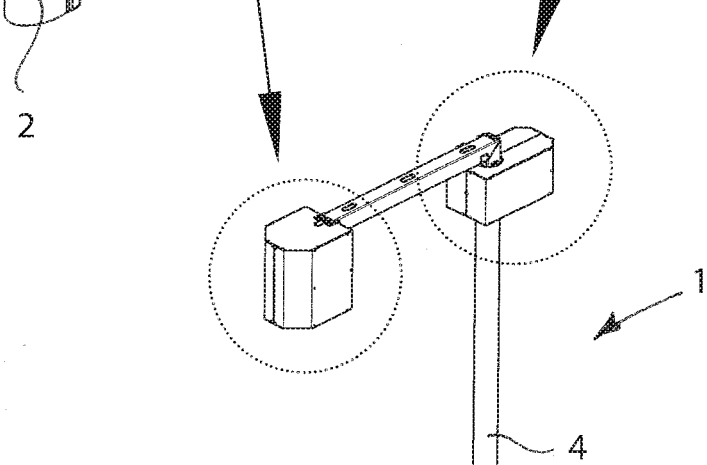
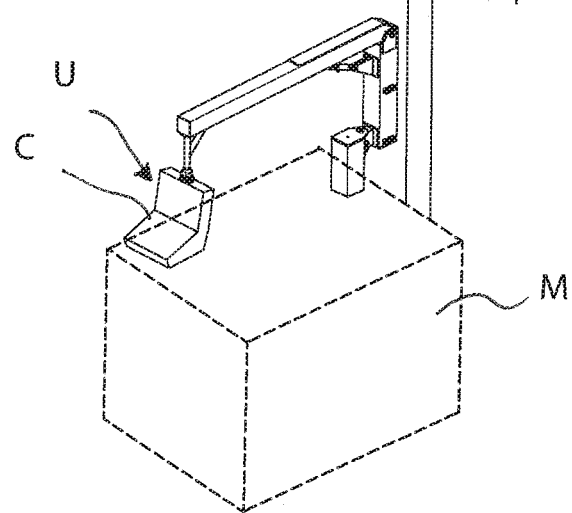
Fig. 2

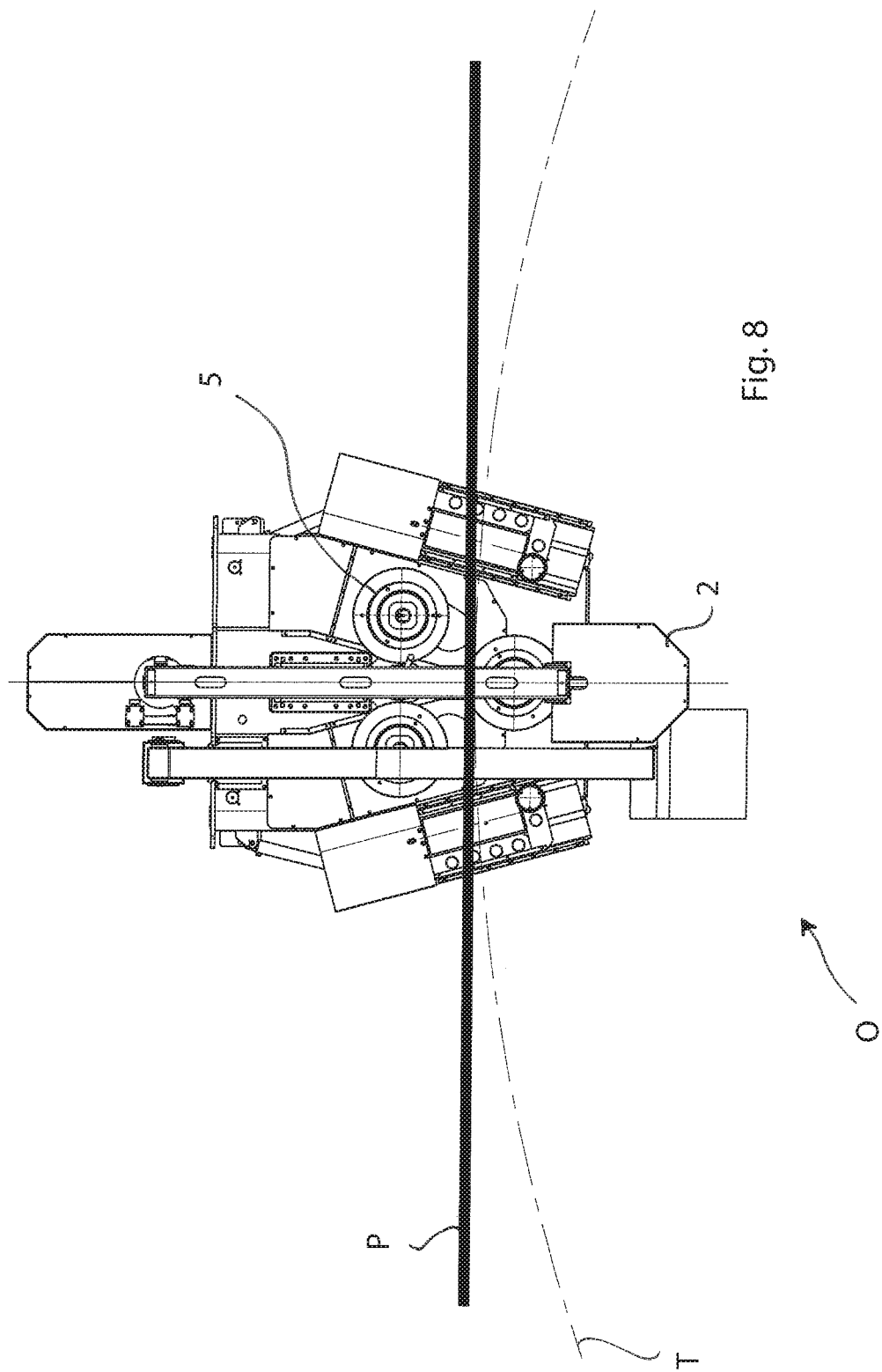

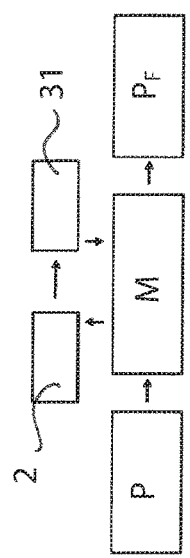
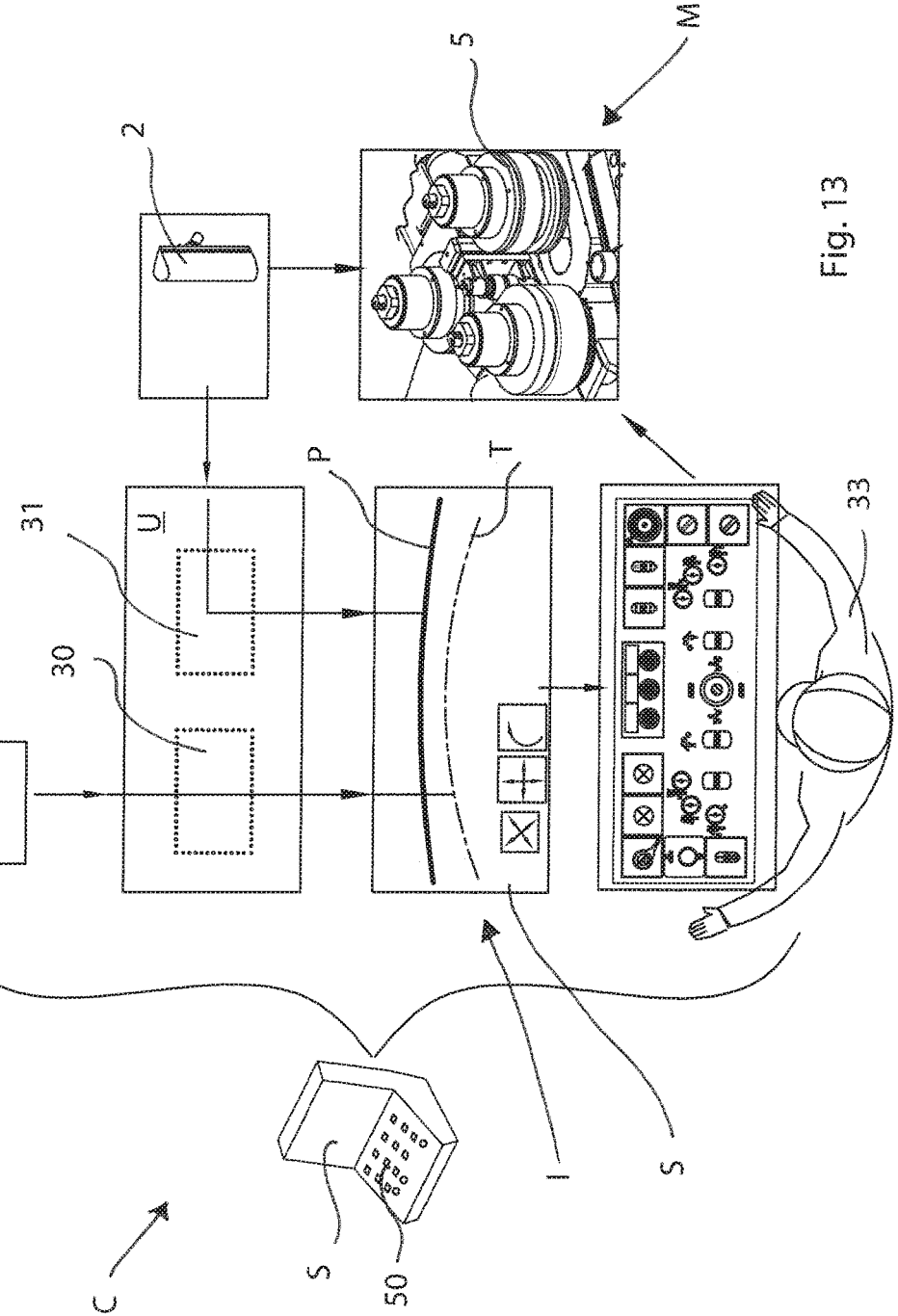
Fig. 12
Fig. 13

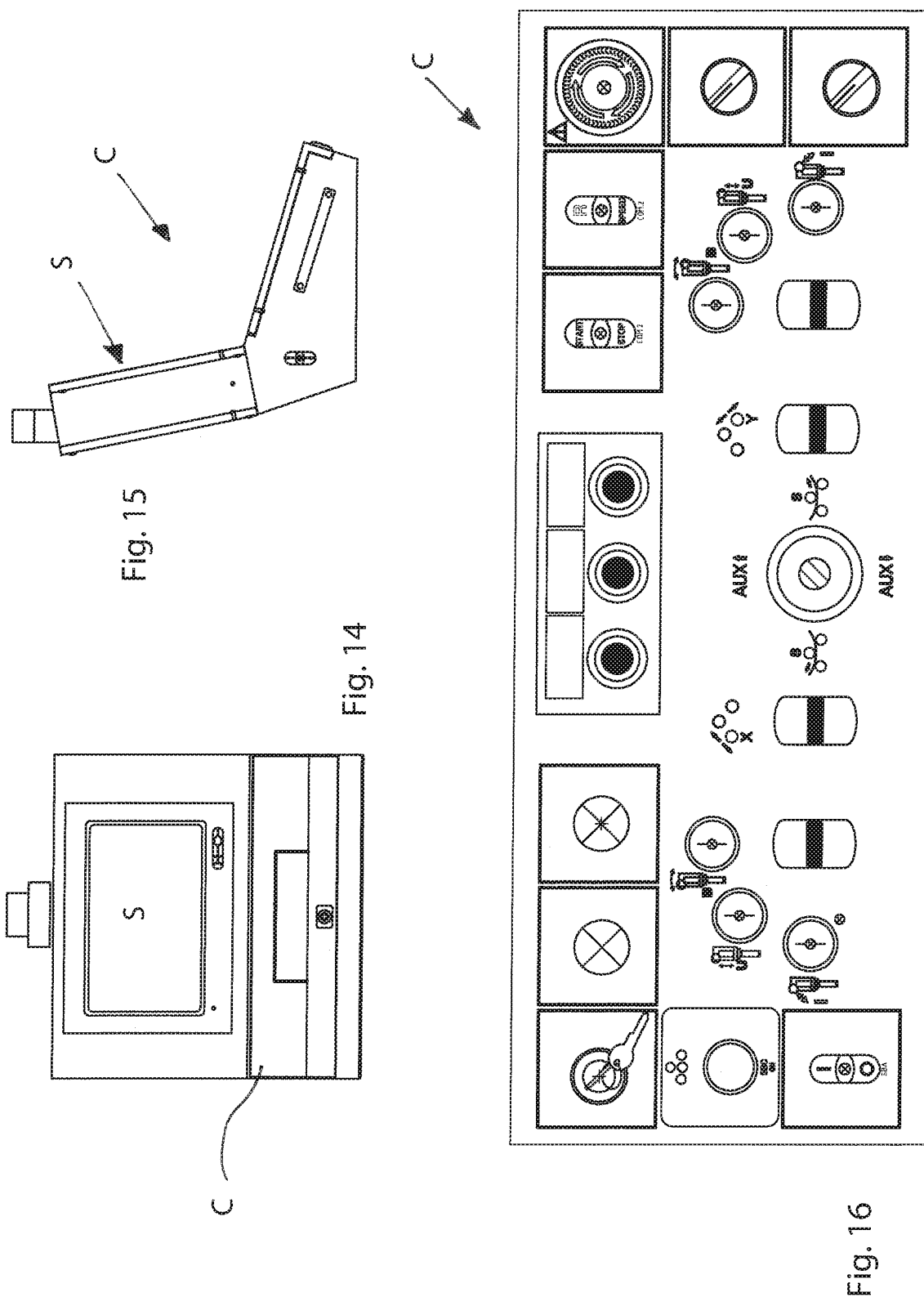

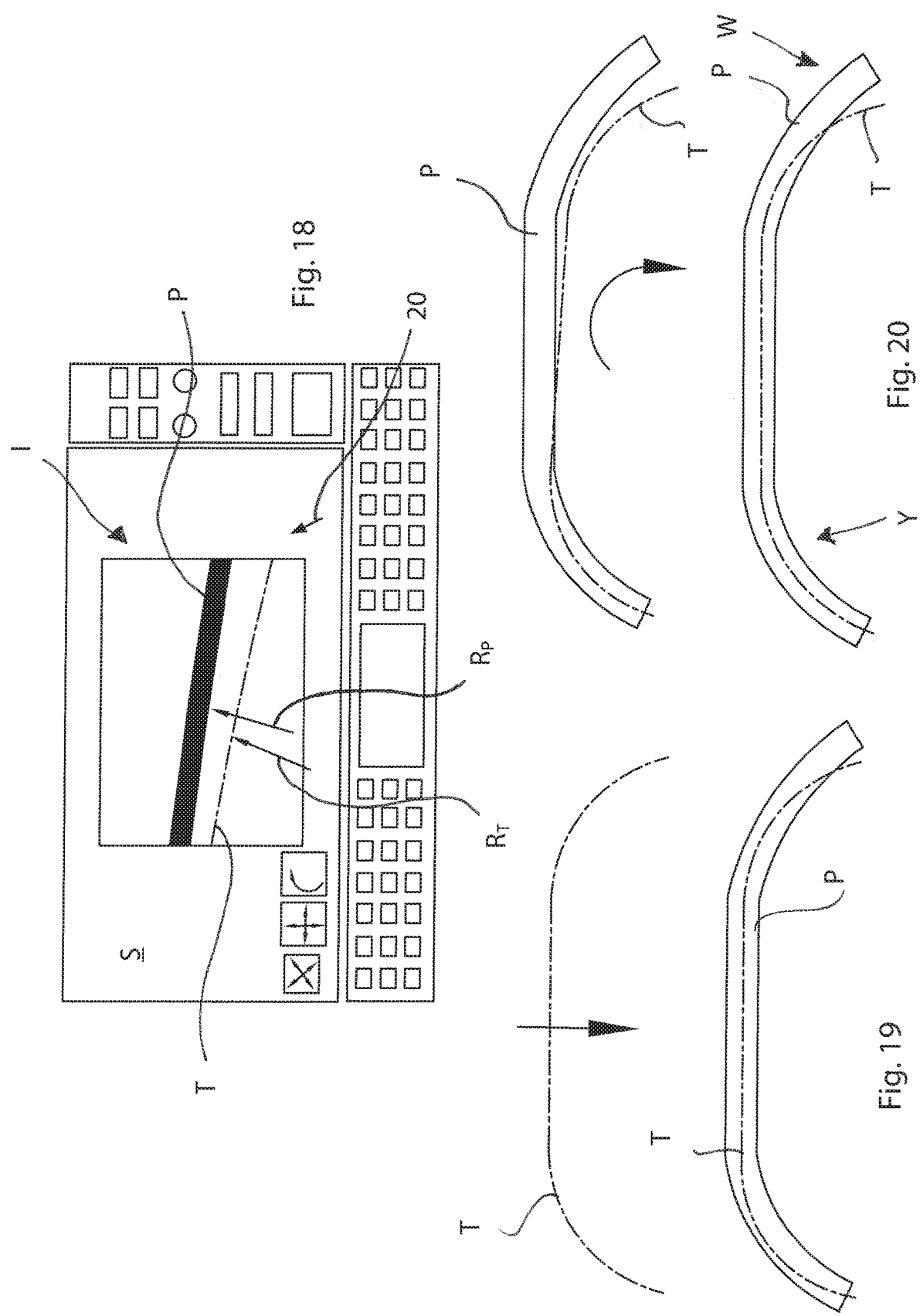

METHOD AND APPARATUS FOR CONTROLLING A PROCESS FOR CURVING ELONGATED PIECES AND ROLLING CURVING MACHINE

CROSS-REFERENCE TO RELATED APPLICATIONS

This application claims priority of International Patent Application No. PCT/IB2019/052693 filed Apr. 2, 2019, entitled Method and Apparatus for Controlling a Process for Curving Elongated Pieces and Rolling Curving Machine. Application No. PCT/IB2019/052693 claims priority of Italian Patent Application No. 102018000004183, filed Apr. 3, 2018. The entire content of these applications is incorporated by reference.

BACKGROUND OF THE INVENTION

The present invention refers to the field of machines or roller devices for curving elongated pieces of significant dimensions, such as beams, bars, section bars, tubes, other semi-finished elements initially having a rectilinear extension and that need to be curved according to one or more radii of curvature to be intended for carrying out construction buildings, such as stadiums, bridges, airports and generally major works.

BACKGROUND ART

They are known roller curving machines, comprising a base onto which work members are mounted, more precisely three or four rollers with vertical axis, driven by suitable motors and arranged to advance and curve at the same time, in one or more steps, the oblong piece to be processed.

Roller rotation, and a suitable movement of one or more rollers with respect to other rollers, with a pushing action on the piece, force on the latter a deformation having a certain curvature.

In the field of major construction works elongated pieces are very frequently required, such as big structural elements, shaped with wide radii of curvature. In order to provide an idea of the extent of the dimensions, the concerned elongated pieces to be curved can almost be 20 metres long.

Presently, in order for curved pieces to respect established tolerances, operators must perform, during the curving cycle, a number of rather difficult operations, that are time-consuming, thus economically detrimental as well as dangerous for the safety of operators themselves. Precisely, the operator (often two or more operators are required, considering that the weighs and dimensions of such pieces are frequently high), must stop driving the curving machine, during the curving processing, and lay a template, for example a metal one, on the piece being processed, to verify if the template corresponds to the concerned curved part of the piece, in order to establish whether the curvature of such zone fulfils determined size/geometric tolerances. The aforesaid curving processing is very often performed in several steps, inverting alternatively the advancement directions of the piece with respect to the machine.

For verification purposes, the operator arranges the template against the piece several times, at regular intervals during the curving cycle, checking from time to time the resulting radius of curvature.

This time-consuming control operation, which requires to move from one end to the other end of the piece (which as said can be 20 metres long) to verify more spots, is very often entrusted to a second operator in support of the first operator who oversees the driving of the curving machine. Consequently, it is obvious that there is an additional cost related to the employment of more operators rather than one.

As regards the aforesaid template, it must be obtained from a light but also strong material, have exactly the geometric shape with the desired radius of curvature to be obtained on the piece and, in order to ensure a certain measurement accuracy, it generally needs to have a minimum width of 1000 mm and maximum width not lower than 1500 mm. In any case, the operator is forced to work holding the aforesaid template which is a heavy and unhandy device. Holding a long and heavy template, that is not perfectly horizontal with respect to the semi-finished piece, certainly affects the measurement result, with high likelihood of errors in measurements.

The curvature verification is performed several times, operating step-by-step, which means by small increasing curving steps, as an excessive curving step, that is with a lower radius of curvature than the required one, would irreversibly compromise the piece being processed.

Apart from being comfortless, time-consuming and tiring, this modus operandi, also forces the operator to have access to dangerous zones of the curving machine, exposing him to potential injuries.

If, furthermore, pieces are to be processed according to geometries and curvatures that differ from piece to piece, it is necessary to prepare a corresponding plurality of templates distinct between them, ready to use, with clear drawbacks related to dimensions and the need to dedicate and manage suitable storage areas for templates themselves. If, as is mostly the case, both the internal and the external radius of curvature of a piece is to be checked, the number of templates remarkably increases, further worsening the aforesaid drawback related to template logistics and storage.

Verification operations become significantly complicated when the dimensions and the wide radii of curvature of the piece to be curved are such that they do not make it possible to simply approach the template to the piece placed on the curving machine. In this case it is necessary to remove the semi-finished piece from the machine—taking it by means of an overhead crane or other lifting and transfer systems—to lay it on the ground such as to compare the curvature with a previously arranged template.

In fact, in case of very wide radii (very much frequent when curving section bars, applied to major construction structures such as bridges, stadiums, airports, etcetera), verification of curvatures would not be feasible by means of rather short templates if compared to the length of the pieces being processed; even minimum "visual" inconsistencies, summed up to the overall curved piece, would generate unacceptable mistakes. For this reason, in many cases it is preferred to "draw" the final curve on the floor, in scale 1:1, forcing the operator to frequently interrupt the machine processing, so as to extract the semi-finished product, lay it on the floor superimposing it on the ideal curvature line drawn on the floor, and reposition it on the machine to continue the curving cycle correcting possible mistaken portions (for example a non-uniform radius of curvature); such operations are extremely complex, time-consuming and expensive due to the high dimensions of the piece, its weight, and due to fact that it is difficult to lift the piece keeping it balanced during its movement from one spot to another of the production plant. According to another known verification mode, it is provided to detect on the various points of the profile, by means of manual templates, the "correct" curvature thereof, after that a total measurement is performed by means of detection of the rope positioning a simple cord from end to end of the profile. Thereby it is possible to have a more or less reliable indication that the profile corresponds to the desired radius/diameter.

The final rope measurement (of the linear type) does not take into account the potential presence, along the profile, of areas having different degrees of curvature (i.e. more "closed" zones in some points and more "open" zones in some others). Consequently, there is correspondence with the radius/diameter required but the "shape" of the profile is unacceptable.

For this reason it is preferred to verify a curvature taking the profile and placing it on the ground on a real scale template (scale 1:1).

There are also measurement systems based on adjustable templates, and systems based on the use of portable electronic devices which however work only for small radii of curvature, they are less precise and also require, in order to work, that pieces to be measured are perfectly clean and with no dirt and rust traces, being the above indicated requirement not always possible to fulfil. To sum up, even these last verification systems are not very precise, versatile and easy to use.

Difficulties considerably increase when pieces must be bent according to geometric configurations having multiple-radius curvatures. In fact, in this case, the operator in charge of the geometric verification, will have to rely on different expedients, such as placing suitable reference marks on the piece to be measured, or arrange a number of pins on the floor among which the curved piece is passed to verify its shape, or rely on measurement systems of coordinates that envisage using a cable and probe connected to an electronic measuring device.

In brief, in the present state of the art, it is impossible to measure in real time, in a reliable way, and in a rapid and cost-effective way, the geometric shape progressively assumed by the piece during its processing.

In the practice, in the light of the aforementioned problems, referring to the processing of multiple-radius curvature, it is sometimes preferred to process single section bar segments, impressing on each one a desired radius of curvature, and finally weld the various segments to obtain a desired final shape. However, solutions envisaging mutual welding of more pieces are not always acceptable for determined types of constructions.

The hypothesis to use control systems from other technical sectors, for instance from the sector related to curving plastic tubes or elements, e.g. PVC, which are rather different from the present one, is not feasible and it is doomed to fail for the following reasons.

For example, they are known distance measurement devices, for example of the laser type, that measure the distances, with respect to a reference, of several points on the piece determining the curvature of the portion concerned by the measurement. In order to measure the curvature of one portion of the piece, more laser transmitters, duly distributed, are required. It is easy to understand that in case of pieces to be processed having big dimensions and that must be bent according to big radii of curvature, this will imply placing the aforesaid laser transmitters at significant distances one from the other, with obvious disadvantages due to the encumbrance and hindrance they cause. The aforesaid transmitters must be positioned along the plane on which the piece to be curved lies and advances, representing a big obstacle and a constraint for the free movement of the pieces to be loaded/unloaded onto/from the machine.

Furthermore, the aforesaid distance measuring devices are rather delicate, and not much suitable for "hard" processing on pieces with significant dimensions for major works as in the present case, and they very often require "reading surfaces" on the piece that are perfectly smooth, without imperfections and clean, which requirement is difficult to fulfil in certain working conditions. In addition, for the correct functioning of laser devices, it is often necessary to place suitable signals or marks on the pieces to be measured, or special labels, intended to interact with laser beams, this being uncomfortable and once more time-consuming.

A control system of the above described laser-type is known for example from US2013/0147093.

Another known apparatus is the one described in US2017/0333968, which relies on 3D cameras and on a complicated and expensive feedback loop control system. Such apparatus processes the 3D views of the piece to be curved and proposes, on the basis of such views, to automatically control the bending process. Such apparatus is substantially developed for the aluminium and PVC small profile field, widely used in the construction and architectural decoration works, that are suitable for this type of process automation. In substance, the field of use of such control system is only limited to small size curving machines, for curving pieces with small radii having lower dimensions than the beams and steel bars to which the hereinafter described invention is directed.

Criticalities occurring in case it is required to process section bars with significant dimensions, or section bars with "light" sections, i.e. having reduced stiffness and thus subjected to risk of deformation of their geometric shape during the curvature cycle, must be considered.

It is the case of big size pieces such as beams, angular elements, tubulars especially if they are thin and in any case all the "unstable" profiles, i.e. having "a little rigid" transverse section, and thereby subjected to an undesired deformation with no possibility to be corrected, in case it is submitted to a curvature process.

It is well ascertained that in such cases, it is not feasible to completely rely on the machine for the automation of the curving process. A distortion of the transverse profile (transverse section) of the piece leads irrevocably to being unable to use the piece itself, with obvious detrimental economic consequences.

Therefore, as the system disclosed in US2013/0147093 is not able to monitor the deformations that affect the transverse profile of the piece, its applicability within the scope of curving the pieces that are concerned in the present description must be excluded.

Furthermore, the known automation systems, as well as the one disclosed in US2013/0147093, are not able to solve, and take into consideration, some unforeseeable and inevitable factors. Such factors are represented by the differences (though minimal) in the dimensional/geometric characteristics and mechanical properties from one piece to another, and also within different areas of the same piece along its extension. Magnitudes that can be subjected to non-uniformity/differences are for example thickness, tensile strength, elastic springback, geometric planarity etcetera.

The factors originating these inconsistencies may result for example from the presence of micro-hole imperfections in the piece, the presence of residual stresses, or a different way of stocking and storing from a piece to another or even from a different zone to another of the same piece: let us think about the case wherein one piece is laid with a part thereof constantly under the shadow and another one under the sun or bad weather, or laid on uneven and not perfectly plane supporting surfaces etcetera.

Even the mere movement and transport of a big piece (whose weight can play an important role in the aforesaid events) is able to affect the characteristics of the piece.

All the aforesaid factors, unforeseeable and uncontrollable in a programmed way, make it ineffective any attempt to completely automatize the curving process, and it is therefore useless to let the curving machine take total control of the piece processing, thus confirming the fact that a skilled user in charge of driving the curving machine is necessary.

In other words, the aforesaid problems highlight the need of the intervention by a skilled operator who, in the delicate step of curving big size section bars having an unstable section, drives the machine progressively deforming, little by little, the section bar, alternating slight bending with rolling of the profile to transform bending into curvatures on a long portion of the section bar, by means of applying limited loads in sequence such as not to cause irrecoverable distortions to the section of the section bar itself.

In the light of the above, there are, to date, wide ranges of improvements in the system for curving big size pieces, that are intended for major construction works and engineering structures. Even though the presence of a good operator is necessary, as already mentioned, it would be desirable to provide the operator with technical solutions that help him in his work.

US2013/319061 and DE29713318 disclose other known systems for curving pieces that are in any case not satisfactory as regards versatility and efficiency of use or that are not even able to fulfil the present needs in the field of big size pieces, that are intended for major construction works and engineering structures.

OBJECT OF THE INVENTION

An object of the invention is to improve the present systems for curving metal elongated pieces, in particular, having high dimensions, that are intended for major construction works and engineering structures.

Another object is to provide a technical solution that is economic and versatile, which is able to reduce to just one the number of required operators necessary for driving a machine for curving big pieces, and able to make available to the operator a number of information that is very important for his job, to spare a number of heavy, hard and dangerous tasks and to make it possible for him to speed up the curving cycles in complete safety, avoiding waste of time and guaranteeing at the same time high levels of precision in curving pieces.

BRIEF DESCRIPTION OF THE INVENTION

These objects and other advantages of the invention can be obtained by means of a method and apparatus according to what set forth in the claims.

Thanks to the invention the limitations of the present apparatuses for curving elongated pieces are overcome.

In particular, thanks to the invention, all operations for verifying and controlling the curvature which are presently being performed manually on the piece once removed from the machine, are avoided.

Owing to the invention, the verification of the right curvature can be performed on the machine thereof, with no need to remove the piece.

The digital system of the control apparatus according to the invention, unlike all the previously described known systems, including control systems with 3D cameras, is configured as an "augmented reality" control system, or computer-mediated reality. In this context, the term augmented reality (AR) means the technology able to provide an operator with a number of additional information with respect to data obtained by the only sensorial perception of the operator himself.

The real image acquired in real time by the camera unit, is processed by the apparatus and enriched with further graphic elements/information which would not be perceived in sensorial way by the operator.

Substantially, another graphic element, in this case the virtual template superimposed on the profile of the viewed piece, is added to the real image (frame, or photograph obtained by the camera-unit) reproduced on the viewing screen element, thus enriching the set of data/information made available to the operator.

In other words, artificial graphic information provided by the virtual template adds up to the visual information represented by the real image of the piece thus increasing the range of information/data made available to the operator to help him verify the correct curving process.

Therefore, unlike the state of the art systems wherein machine operators are forced to manually obtain information on the correctness of the curvature (by means of physical templates), the present apparatus makes available to the operator an enriched number of artificial information (virtual template, radius, arrow, rope, etcetera) graphically reproduced on the screen element and that can easily be looked through from the control workstation.

The control apparatus according to the invention does not require employees on board the machine to verify the curvature, but only an operator in charge of driving the curving machine. Once the piece is loaded on the curving machine, it is possible to constantly monitor in real time how processing develops by virtue of images reproduced on the screen element, and therefore compare geometry, in particular the curvature, progressively assumed by the piece with the virtual template superimposed on the real image of the piece.

Thanks to the invention, it is possible to process, in complete safety, major complex structures even with multiradius curvatures with clear advantages in terms of reduction of operating time and increase in safety levels for operators.

The greater the dimensions of the pieces to be curved and/or the more complex the curvature geometric configurations that it is desirable to obtain, the more all the advantages obtained by the present invention will be appreciated.

Further characteristics and advantages will result from the dependent claims and from the description.

BRIEF DESCRIPTION OF THE DRAWINGS

The invention will be better understood and implemented referring to the enclosed drawings, which illustrate an exemplary and non-limiting embodiment thereof, wherein:

FIGS. 1 and 2 show the apparatus according to the invention combined to a roller curving machine;

FIGS. 3 and 4 are enlarged views of details taken from FIG. 2;

FIG. 8 shows the apparatus in an operating position;

FIGS. 12 and 13 are block diagrams relative to the work of the apparatus according to the invention;

FIGS. 14 to 16 show a control console included in the apparatus according to the invention;

FIGS. 17 and 18 schematically show a graphic interface associated to the aforesaid control console of the apparatus;

FIGS. 19 and 20 schematize a piece and a virtual template and potential operations made possible by the apparatus according to the invention.

DETAILED DESCRIPTION OF THE INVENTION

Figure 1:
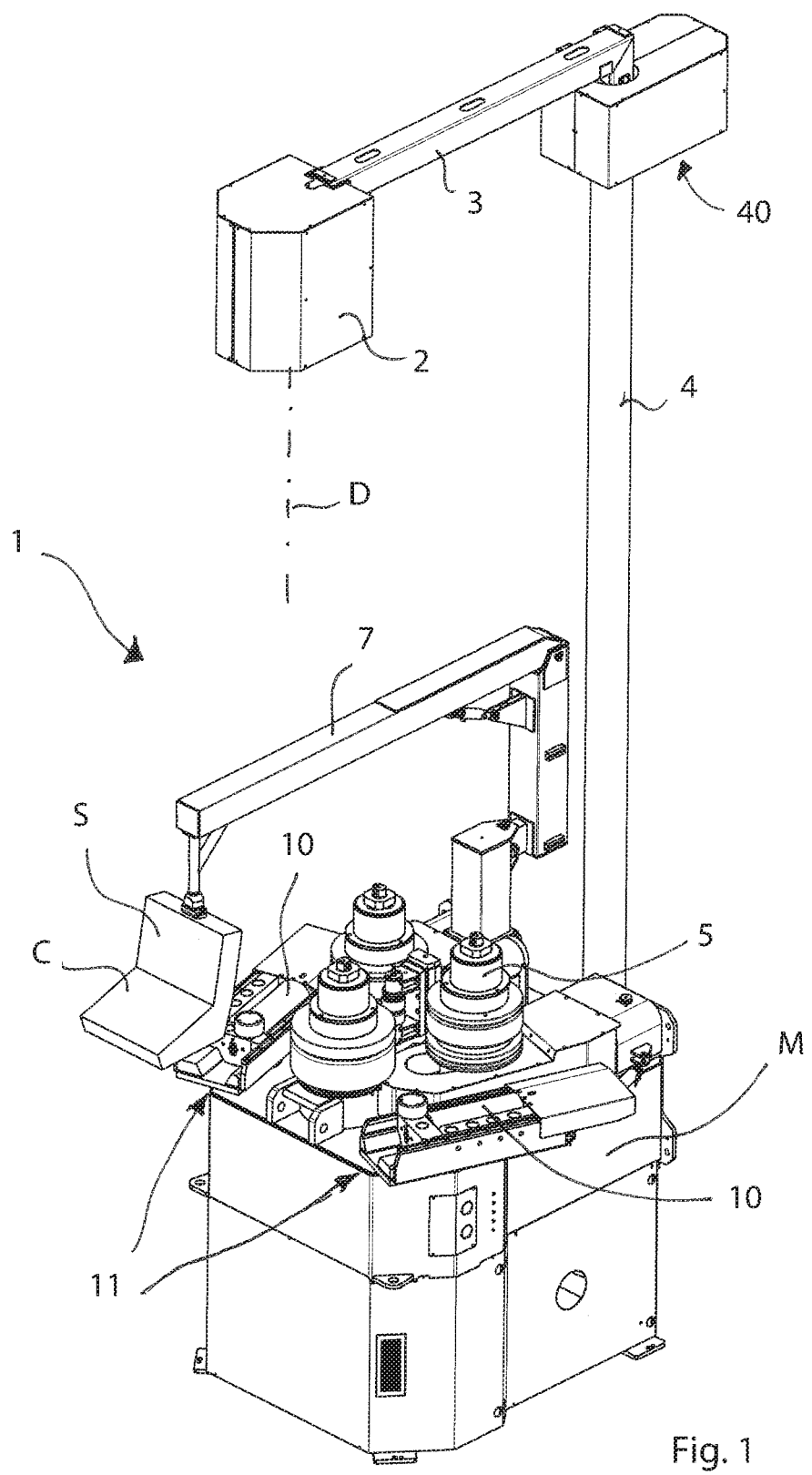
Figure 5:
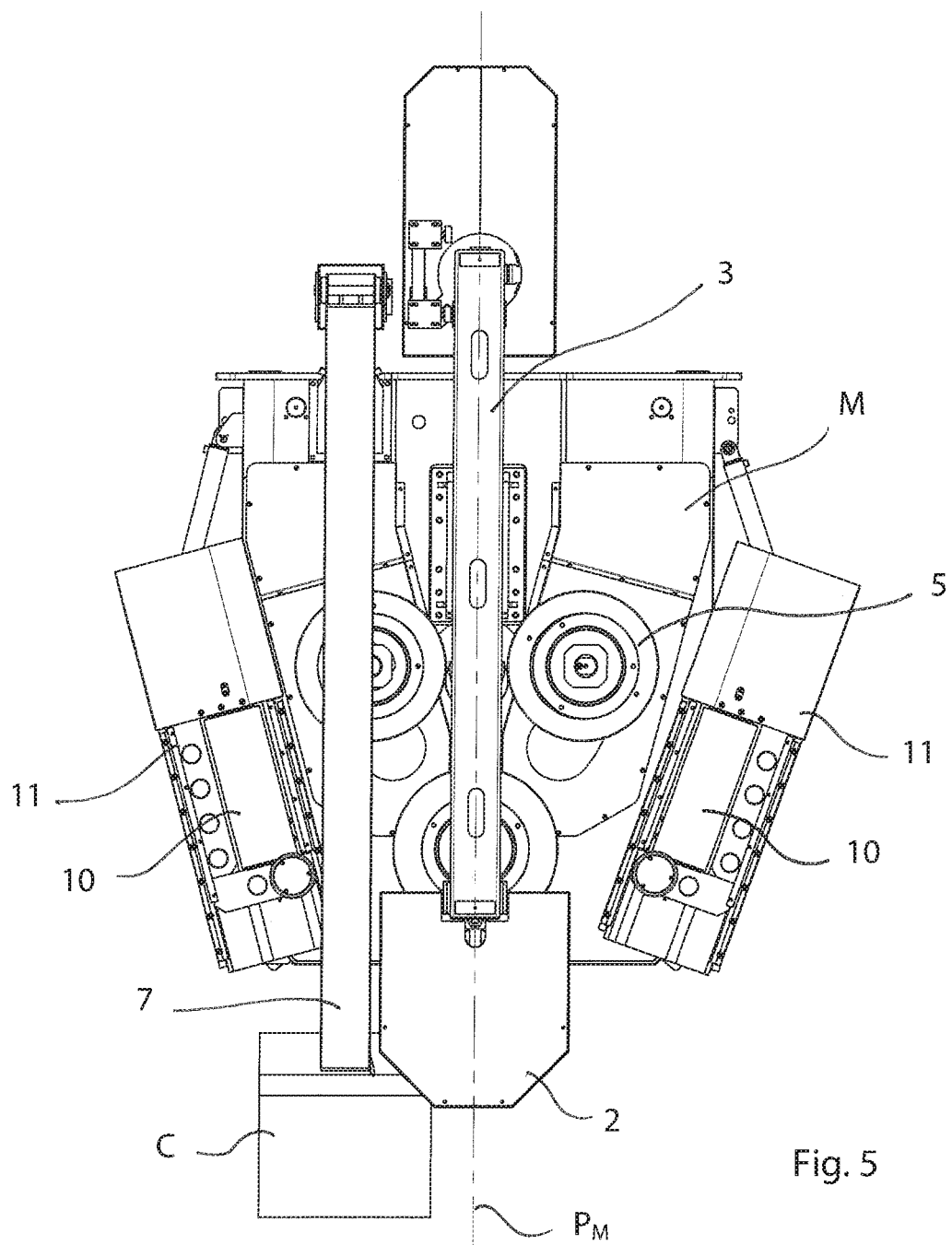
FIG. 5 is a view from above of the apparatus combined to the curving machine.
Figure 7:
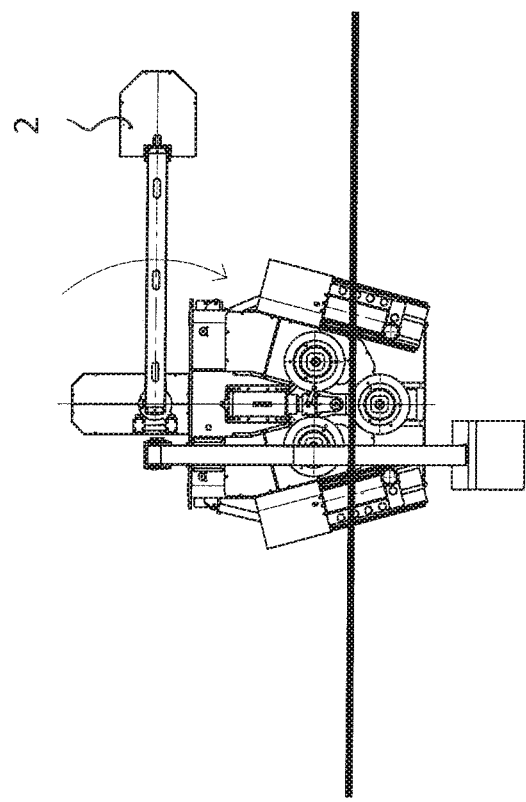
FIG. 7 shows the apparatus in another position.
Figure 6:
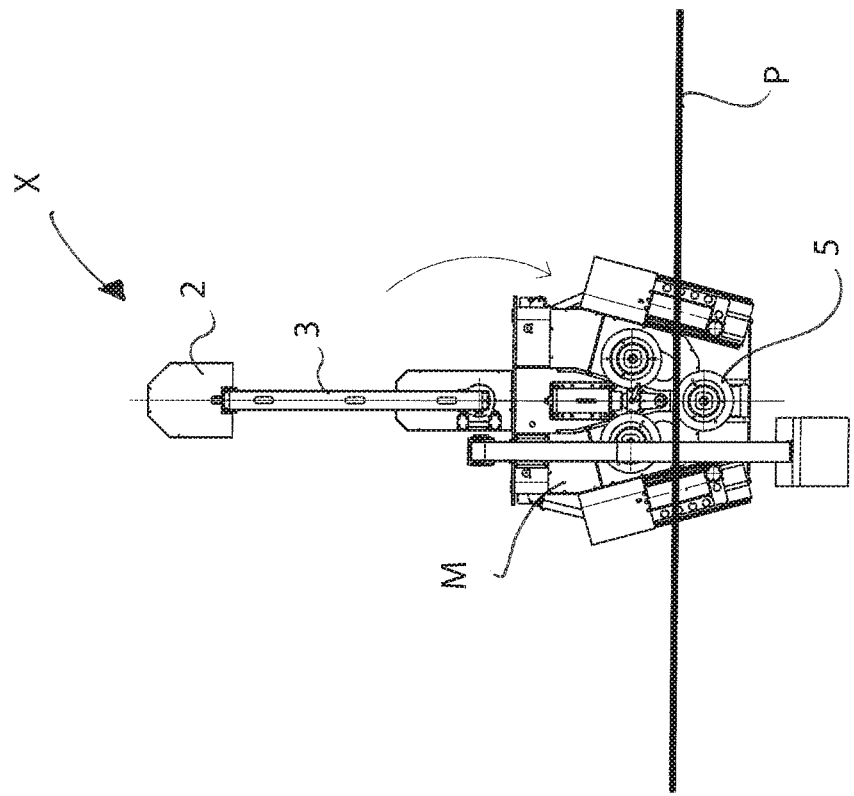
FIG. 6 is a view from above showing the apparatus in distancing position.

Referring to the enclosed figures, it is shown an apparatus 1 for controlling a process for curving big size elongated pieces P, such as beams, section bars, tubes, other semi-finished elements to be curved, that can be used in the manufacturing of major engineering and construction structures, such as stadiums, bridges, airports, etcetera. The present apparatus 1 is adapted in particular to be assembled on a roller curving machine M, for example of the three- or four-roller type.

In the exemplary and non-limiting case shown in the figures, the curving machine M is of the three-roller type (indicated by number 5), having vertical rotation axis.

The curving machine M is provided with rolling elements 10, for example oblong stand rollers 10, supported by slides 11 with adjustable position, and arranged to support the piece P in the outer area adjacent to curving rollers 5, in other words upstream and downstream of rollers 5 with respect to the advancement of the piece P.

The apparatus 1 comprises a digital system that includes a control console C that is provided inside with a programmable processing unit U and provided with a high-resolution screen S (or also several screens S), for viewing data, which is operatively coupled to a high-resolution graphic card, provided with its own CPU.

In particular, the control console C can be composed of a computing apparatus, such as a personal computer, operating with a desired operative system, such as for example a Windows operative system.

The screen S can be composed of the screen already provided in the curving machine M, or there can be one or more additional screens.

The apparatus 1 comprises a camera unit 2, operatively connected to the aforesaid processing unit U, and configured and positioned for acquiring images in real time of the elongated piece P to be curved by means of the aforesaid roller curving machine M.

The aforesaid images, which will be discussed later, can be frames obtained by a video acquisition by the camera unit 2, or photos acquired directly and in sequence by the camera unit 2.

In particular, the camera unit 2 is a 2D high definition CCD (Charge Coupled Device). In particular, the focusing of the camera unit 2 is of the fixed type, in order to provide images ensuring a low optical deformation.

In particular the camera unit 2 is of the black-and-white type such as to guarantee a higher definition.

The camera unit 2 is placed at a higher height than a horizontal work plane on which the elongated piece P to be curved lies and advances. Precisely, the camera unit 2 is supported by a horizontal arm 3 which is in turn coupled to a vertical upright 4 which can be fixed to a base or frame of the roller curving machine M. The horizontal arm 3 and the vertical upright 4 are configured to make possible an adjustment of the vertical position as regards the height of the camera unit 2, which for example can be varied from about 3 metres to about 10 metres over the horizontal plane on which the piece P being processed lies.

The camera unit 2 is oriented according to an optical direction D for the image-acquisition that is substantially orthogonal to the horizontal work plane, that is parallel to the rotation axis of rollers 5 of the curving machine M.

The precise operating position O of the camera unit 2, within which image acquisition must occur, is mechanically adjusted, or by means of electronic driving with a preestablished calibration procedure that enables precise measurements, correcting resolution errors. The calibration procedure is made possible by means of aim members and references cautiously positioned on the curving machine M.

The support arm 3 is rotatably connected to the vertical upright 4 in order to makes possible to move the camera unit 2 from the operating position O, wherein it aims at the working area, to a distancing position X wherein it eases the operations of loading and removing the elongated piece P on/from the roller curving machine M.

It is provided an electric motor 40 that is controlled by the control console C and provides to rotate the support arm 3 from the operating position O to the distancing position X and vice versa.

In an alternative variant, the camera unit 2 is supported in a fixed and non-rotating position.

The apparatus 1 comprises one or more position sensors 6 arranged to detect the angular position of the support arm 3 with respect to the vertical upright 4 and to control with precision the correct reaching of the operating position O and the distancing position X.

The support arm 3 and the vertical upright 4 are arranged such that a centreline plane $P_M$ of the camera unit 2 coincides with a vertical plane of symmetry of rollers 5, in the operating position O. In this way, the acquired images are centred on the main work zone of the curving machine M.

The control console C is supported by a further support arm 7 that extends until a control front area intended for an operator 33. The further support arm 7 is also mobile to make possible the loading/removing operations of the elongated piece P on/from the curving machine.

The control console C comprises a graphic interface of tactile type, a physical keyboard 50, an aiming device 60, such as a "mouse" and/or "touchpad" element, and possibly also a light pen, that can be useful for example to select—by means of direct contact on the viewing screen S—determined points of the image.

The digital system enables the input (schematically represented by block 32 in FIG. 13), by the control console C, and storage into a specific memory 30, of the processing unit U, of the profile of at least a virtual template T of curvature. The digital system is configured to reproduce on the screen S the real images I of the elongated piece P, detected by the camera unit 2, and processed by a software 31 integrated in the apparatus 1.

The profile of the virtual template T of curvature is directly created by the control console C. It is also possible to load a previously created file of the virtual template T of curvature by a graphic software of the CAD/CAM/CAE type. The previously created file can be imported and stored in the memory 30 from which it is called up by the digital system software to be reproduced on the viewing screen S.

The processing unit U is programmed to graphically reproduce the profile of the virtual template T (or of templates) superimposed to the real image I of the piece P to enable the operator 33 to visually compare the shape of the piece P being processed with the virtual template T superimposed on the screen.

If desired, it is possible to load/generate and reproduce on the screen S more virtual templates T, corresponding to profiles of partial curvature, i.e. more emphasized until they coincide with the desired final theoretical shape. The usefulness of such operative mode can be in particular appreciated in case in which rather complicated curvature configurations must be obtained, such as highly emphasized curvatures (reduced radii of curvature) and multiple-radius curvatures, with high radii variety. In this case, it is possible to compare, at intermediated steps of the process, the piece P being processed from time to time with a corresponding partial virtual template T, corresponding to a profile of partial curvature.

As shown in the simplified flowchart of FIG. 13, based on the visual comparison made possible by the digital system, that is easy and quick to use, the operator 33 can intervene giving suitable commands to the curving machine M, thus checking step by step various process parameters (speed, load applied, etcetera) adapting them to the current state of the piece being processed. The task of the operator 33, who can take advantage of the precious information supplied by the digital system of the present apparatus 1, is just to drive the roller curving machine M to adapt the curvature and the geometric configuration of the elongated piece P to the theoretical profile of the virtual template T of curvature.

As previously mentioned, the digital system of the control apparatus 1 according to the present invention is configured as an "augmented reality" control system, i.e. a system able to provide the operator 33 with information in addition to the mere visual perception of the image of the piece P being processed: substantially, the further graphic element composed by the virtual template T superimposed to the viewed image of the piece P is added to the real image I of the piece P (frame, or photograph obtained by the camera unit 2) reproduced on the viewing screen S, thus enriching the set of data/information made available to the operator 33.

The overall visual information given by the real image of the piece P matched with the artificial graphic information provided by the virtual template T ease significantly the operator 33 task in verifying the correct development of the curving process.

Unlike the automatic systems of the state of the art wherein the operator does not intervene during the working cycle (whose use for the present applications herein discussed is not feasible due to the above seen reasons), in the present case he takes advantage of useful graphic information provided by the control apparatus 1 to suitably drive the curving machine M, succeeding in avoiding working imprecisions and most of all irreparable distortions of the profile of the transverse section of the piece P.

Thanks to the optical digital system according to the present invention, the virtual template T plays the role of clear reference graphic element, in relation to which the operator 33 can constantly, in real time, compare the piece P being progressively curved.

Obviously, the virtual template T represents a tool that can be used immediately, intuitive and very easy to use, by all curving machine operators.

Figure 9:
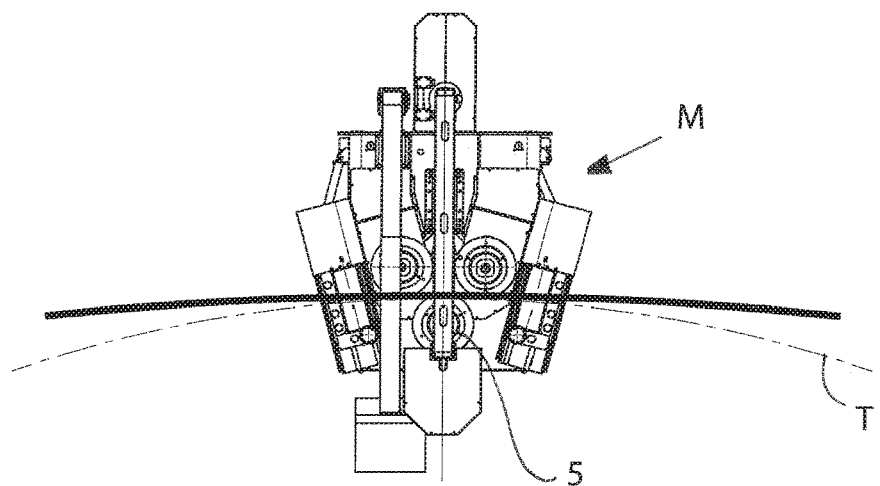
FIGS. 9 to 11 show the progressive operation for curving one piece.
Figure 10:
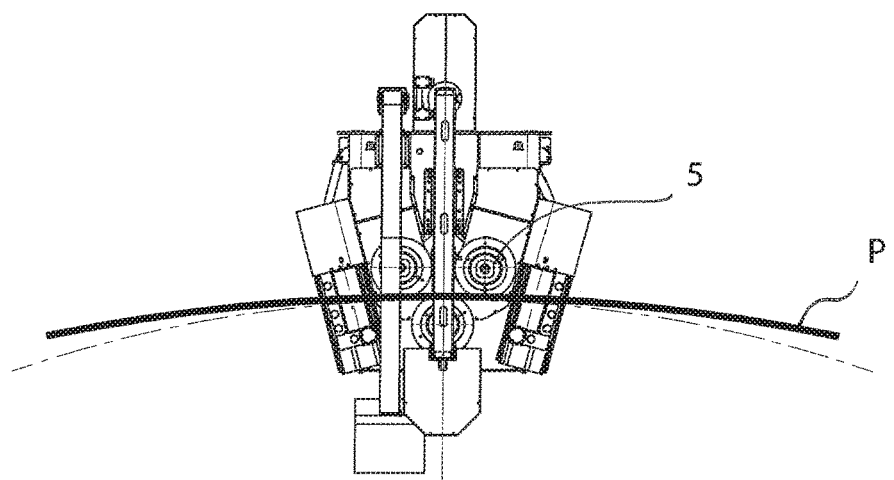
Figure 11:
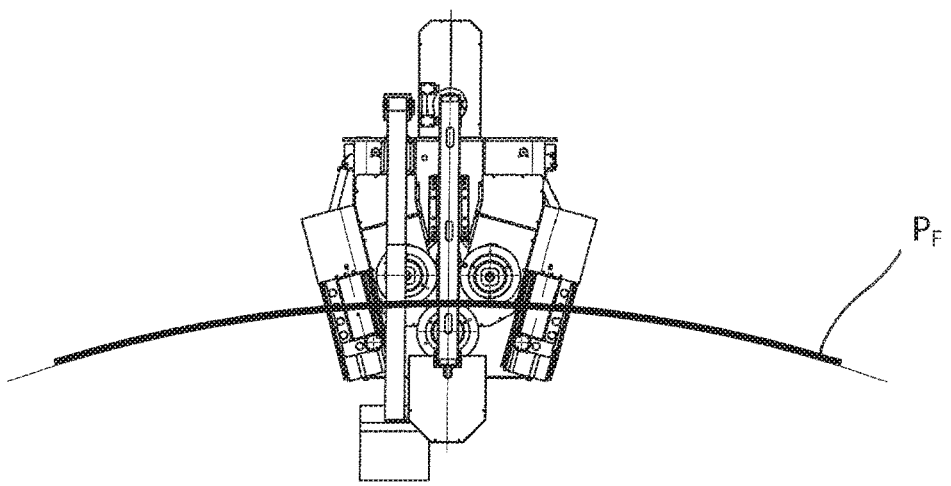
Figure 17:
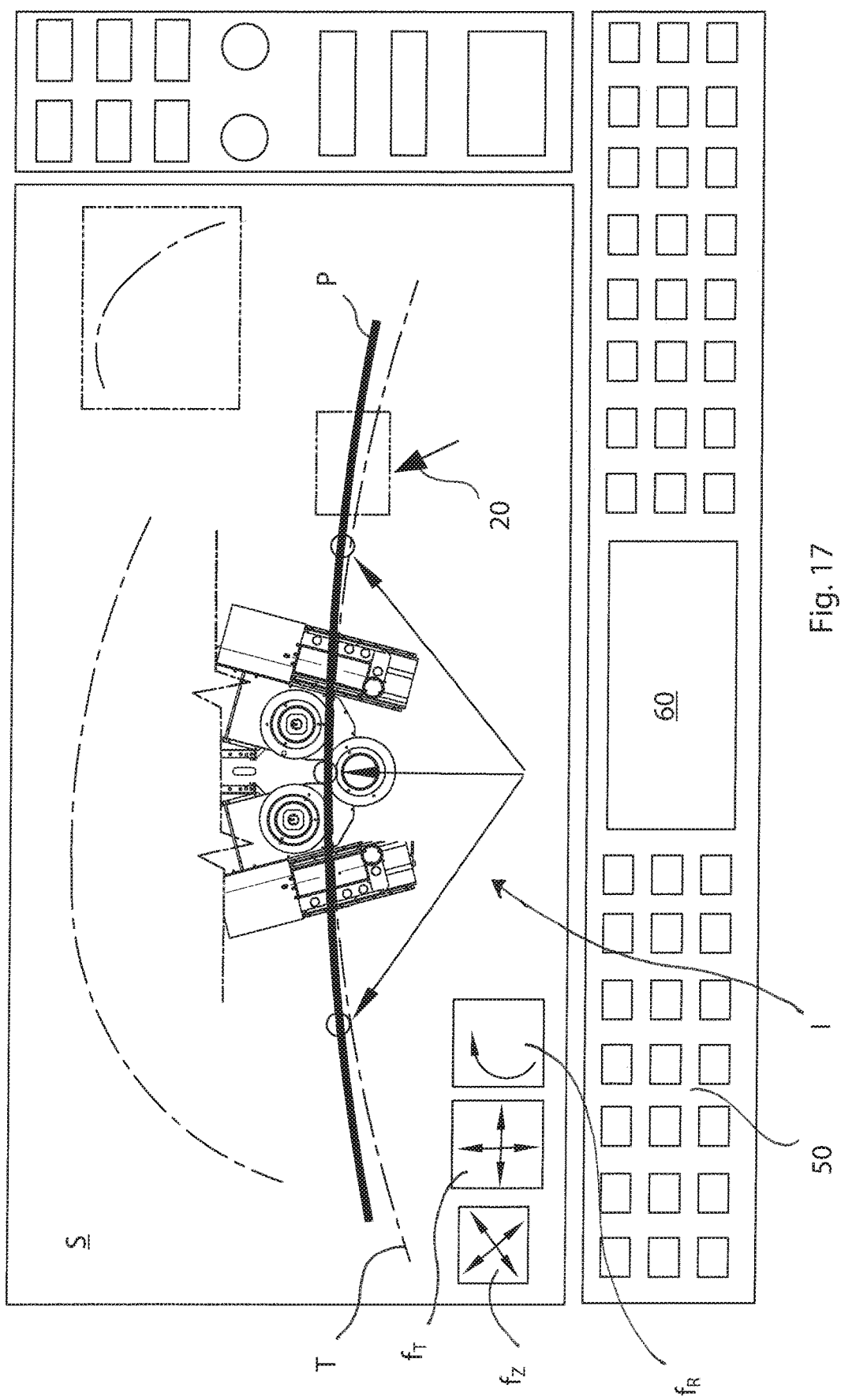
Figure 21:
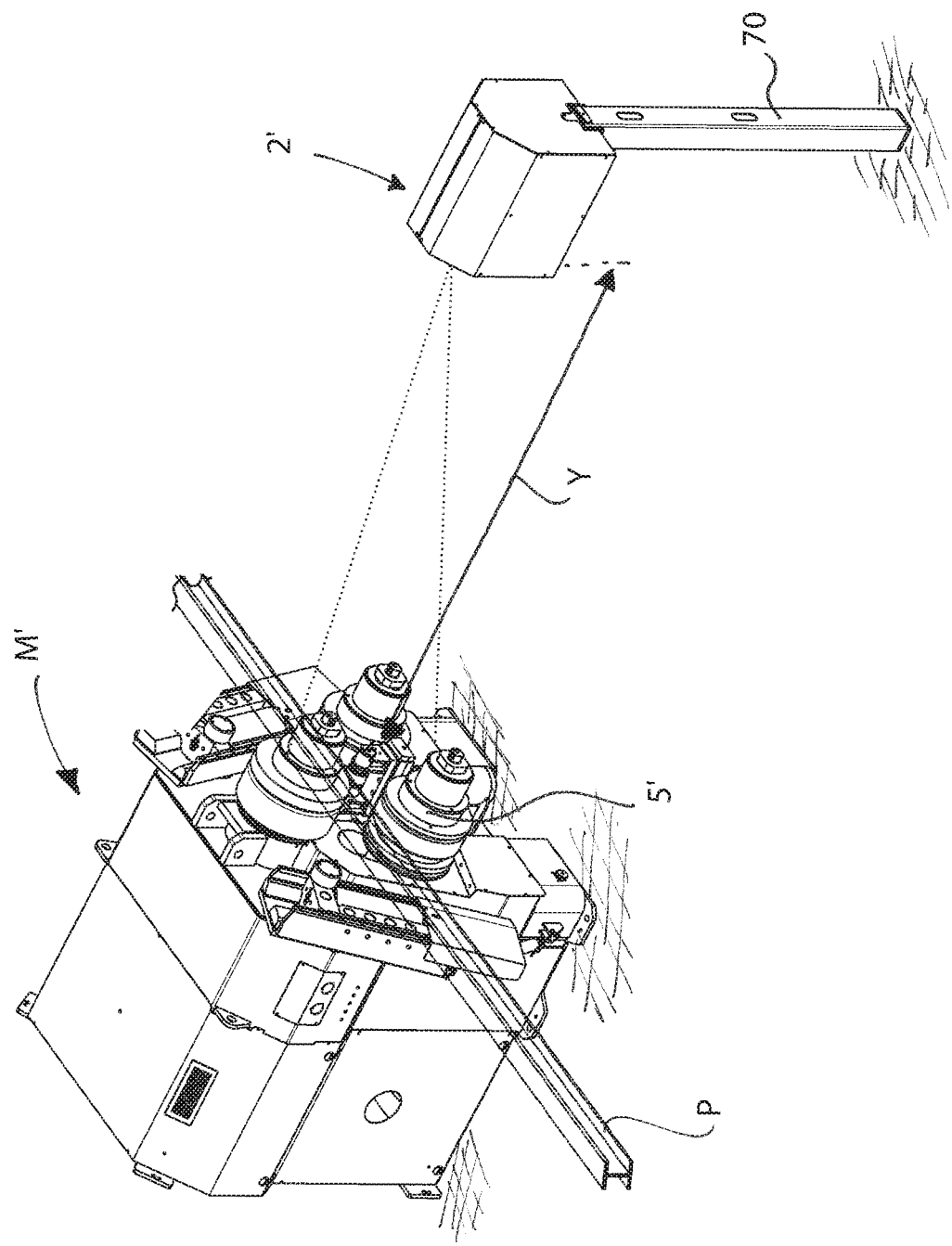
FIG. 21 shows another embodiment of the apparatus according to the invention, adapted to be mounted on a curving machine provided with rollers having horizontal shafts.
Figure 23:
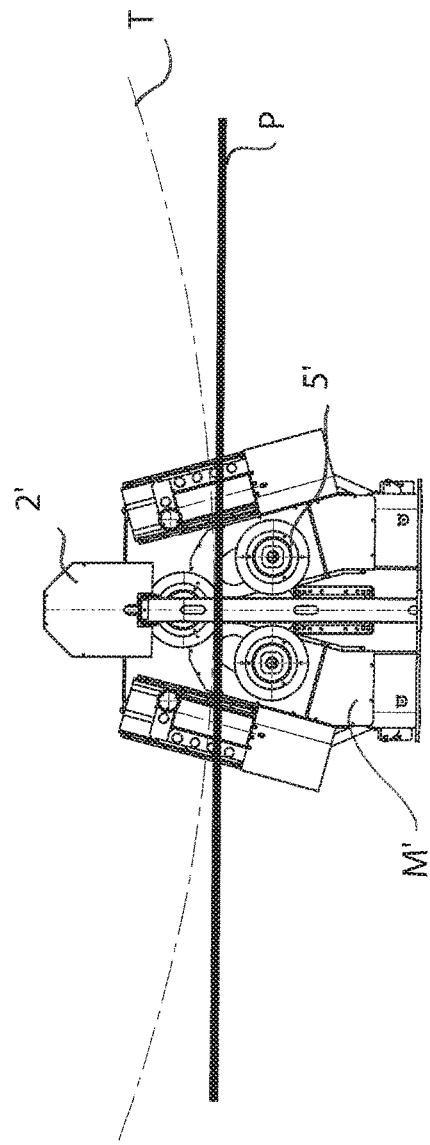
FIG. 23 shows from the front an apparatus combined to the curving machine on which a beam to be curved is loaded.
Figure 22:
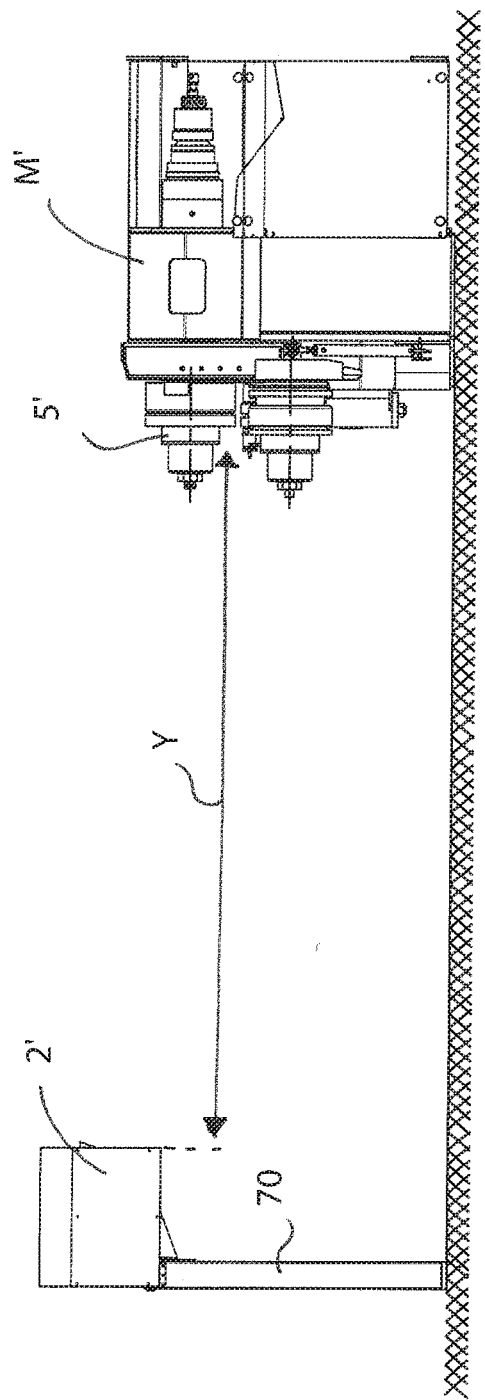
FIG. 22 is a side view of the apparatus combined to the curving machine shown in FIG. 21.

In function, the operator 33 manually controls the machine M, submitting the piece P to several runs (according to alternate advancing directions) through the machine rollers, such as to progressively curve the piece P. The profile of the real piece P, viewed on the screen S, as a result of the subsequent runs in the machine M, adapts progressively approaching to the desired final shape (piece $P_F$) represented by the virtual template T. FIGS. 9 to 11 show by way of example the progressive curvature of the piece P from its initial rectilinear configuration to the final shape (piece $P_F$).

In order to verify step by step the geometry of the piece P being processed, the operator 33 can, acting on the console C, translate, rotate, enlarge a part of the virtual template T superimposing it to a preestablished area of the real image I of the piece P. In particular, the operator 33 can superimpose one (or more) virtual template T both on the inner outline of the piece P (to measure the inner radius of curvature) and the outer outline of the piece P (to measure the outer radius of curvature).

The software, included in the digital system of the apparatus 1 according to the invention, makes available to the operator 33 a wide range of graphic tools to progressively verify the curvature of the piece P being processed, and to measure different geometric magnitudes such as radius of curvature, arc, arrow, rope etcetera.

Some functions made available by the apparatus 1 software are hereinafter reported for exemplary purposes.

The operator 33 can move the virtual template T viewed on the screen, to superimpose it on a desired zone of the image I that reproduces a determined portion of the concerned piece P. In addition to this dragging function $f_T$, also a rotation function $f_R$ of the virtual template T, and also a zoom function $f_Z$ are available to select and enlarge a determined area of the image I to enable a more accurate and restricted analysis on the portion concerned of the piece P.

In FIG. 19 they are schematized the piece P, in a working intermediate step, and the virtual template T, that can be dragged, on the screen S, until it superimposes on the piece P which appears on the real image I.

FIG. 20 shows by way of example the piece P in another possible working intermediate step: the virtual template T can be rotated, in addition to dragging, to be superimposed on the piece P and check curvature in the various zones. In this example case, superimposing the template T on the piece P highlights a correct curvature condition in the left portion Y, however it suggests the operator 33 that the portion on the right W still needs one or more curvature interventions.

Thanks to the "zoom" function $f_Z$, the operator 33 can select and enlarge a determined area of the image I of the piece P to locally verify its geometric shape.

This function and operative possibility are shown in FIG. 18, where it is shown an enlarged view of a portion of the piece P that locally has a radius of curvature $R_p$, not yet equal, in particular still greater than the local radius $R_T$ of the reference virtual template T.

The digital system of the control apparatus 1 makes also available to the operator 33 the possibility to superimpose the virtual template T along the centreline of the piece P. In this case the piece P can be curved aiming at matching its curvature centreline or median line to the desired profile of average curvature.

Such a possibility was not conceivable until now with the present apparatuses and with the manual-type verification systems with physical templates, due to the impossibility to have reference points where the physical template can be laid.

For greater ease ad efficiency in graphical viewing, the operator 33 can assign certain colours to the virtual template T, or he can highlight zones of the image I, according to his own preferences.

It is possible to measure the radius or diameter of curvature by simply "clicking" with the mouse (moving the cursor 20) on three (or more) points on the profile of the piece being processed that is reproduced on the screen S thanks to the camera unit 2 acquisition.

The measurement of the arrow simply occurs by "clicking" on the points of the profile concerned, and the measurement of the arc occurs similarly.

All the aforesaid verification and checking operations can be easily performed by the operator 33 at his workstation near the comfortable ergonomic control console C, with no need to continuously move around the machine M or having to resort to one or more assistants for measuring and checking operations.

The digital system of the apparatus 1 also enables to measure the overall length of the piece P.

The measurement of the overall length of the profile occurs processing a plurality of photos acquired in sequence, which, after being mutually reassembled by the software 31 integrated in the control apparatus 1, lead to reproduce the definitive geometric shape of the whole curved piece P.

According to a possible variant, shown with reference to FIGS. 21 to 26, the control apparatus 1 is adapted to be used on a curving machine M' of vertical type, having rollers 5' with horizontal shafts. In this case, the camera unit 2' is positioned in front of the curving machine M'.

The camera unit 2' is supported by a turret 70 fixable or that can be rested on the ground.

Figure 24:
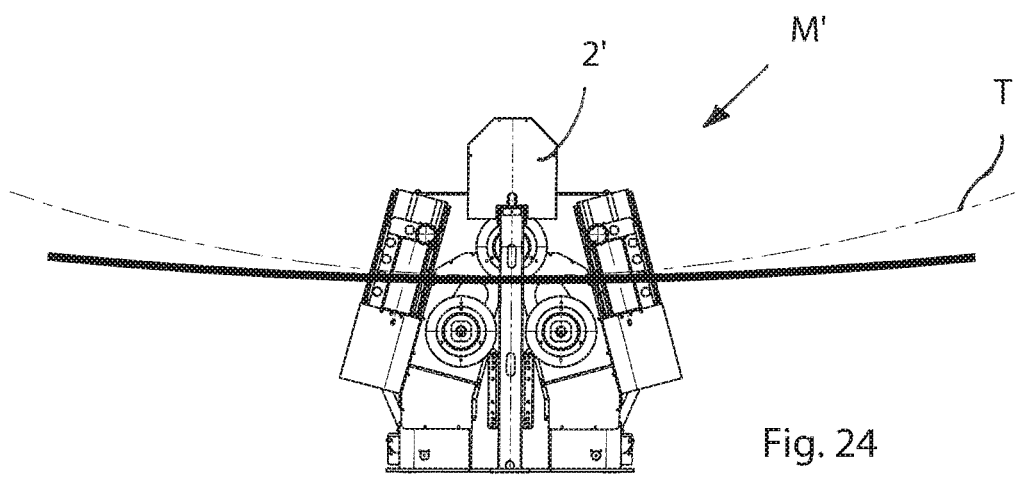
FIGS. 24 to 26 show, in sequence, different steps of processing the beam placed on the curving machine with horizontal rollers.
Figure 25:
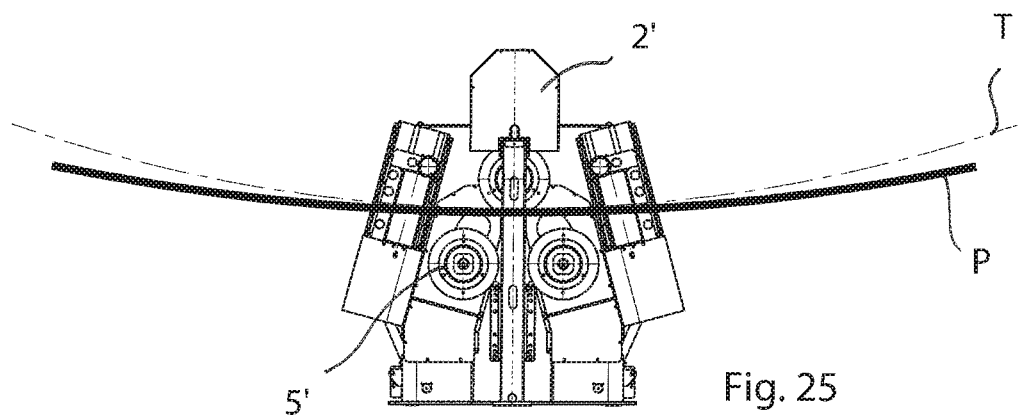
Figure 26:
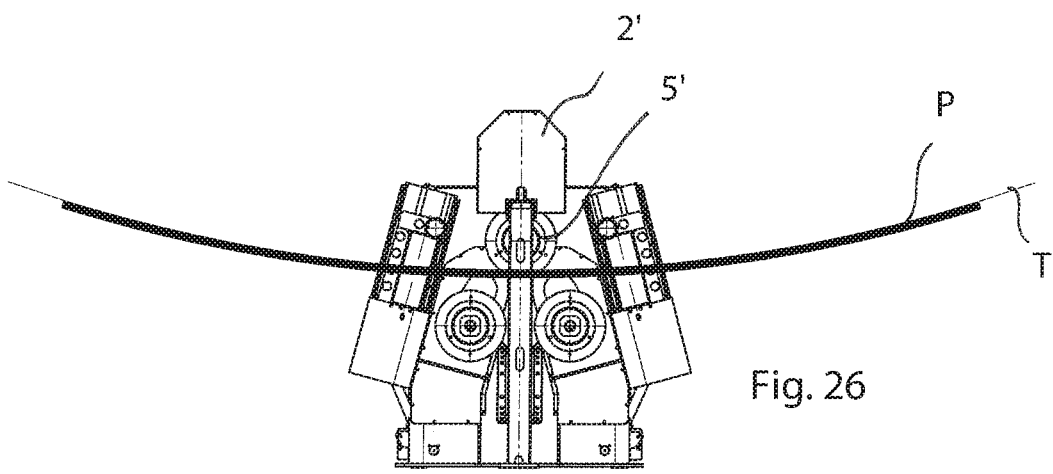

The camera unit 2' is placed at a due distance Y with respect to the vertical work plane on which the elongated piece P to be curved on the curving machine M' lies and advances. In FIGS. 24 to 26, different steps for bending the piece P are visible in sequence, for exemplary purpose.

The operation of the control apparatus 1 is in this case at all similar to what already described in the previous embodiment.

From what said and shown in the enclosed drawings, it is evident that a method and an apparatus 1 obtaining the objects set forth are provided.

Thanks to the invention it is possible to curve an elongated piece P in conditions of total safety for operator 33, who can control the machine M and also verify in real time the curvature state of the piece P remaining directly and easily in his workstation before the control console C.

The advantages of a greater working precision and increase in safety for operators are integrated by further advantages as speeding up the curving cycle and reducing downtimes.

It is evident that the control apparatus 1 according to the invention can be applied to the iron and steel industry (especially in the heavy one), to carry out bridges, airports, stadiums, big containers (pressure tanks, boilers, heat exchangers, tanks in general, etcetera), components used in the wind industry, etcetera.

The control apparatus 1 is addressed to all the users of curving machines of any type; the presently used curving machines can be easily equipped with the control apparatus 1 by means of retrofit.

It must be understood that what said and shown in the enclosed drawings is only for illustration purpose of the method and general characteristics, as well as of an embodiment of the apparatus 1 according to the present invention.

Other modifications or variations can be made to the entire apparatus 1, or parts thereof, and to the corresponding operating method, while remaining within the scope of the claims.

The invention claimed is:

1. Method for controlling a process for curving an elongated piece by a digital system including a control console provided with a programmable processing unit and with a viewing screen for displaying data, associable with a roller curving machine for curving said elongated piece, and a camera unit, operationally connected to said processing unit, and configured and positioned for acquiring images of the elongated piece to be curved by said roller curving machine; comprising the steps of storing the profile of at least one virtual template of curvature in said processing unit of the control console;

orienting said camera unit according to an optical direction for the image acquisition substantially orthogonal to a working plane on which said elongated piece to be curved lies and advances, detecting, by said camera unit, a real image of the elongated piece to be curved positioned on said roller curving machine, said image being composed of a frame obtained by a video acquisition from said camera unit or of a photograph directly acquired by said camera unit;

simultaneously reproducing the profile of said at least one virtual template of curvature and the real image of the elongated piece to be curved detected by said camera unit on said viewing screen for enabling an operator to graphically compare the piece being progressively curved with said virtual template serving as a reference graphical element and for enabling the operator to manually drive said roller curving machine for adapting the profile of said elongated piece to the profile of the virtual template, the profile of said at least one virtual template being graphically reproduced by said processing unit superimposed to the real image of the elongated piece on said viewing screen to enable the operator to visually compare the shape of the piece being processed with said virtual template superimposed on the viewing screen;

manually comparing by the operator in real time the real image of said elongated piece reproduced on said viewing screen with the profile of said at least one virtual template, reproduced on said viewing screen and superimposed on said real image;

manually controlling by the operator said roller curving machine submitting said elongated piece to several runs according to alternate advancing directions through machine rollers included in said roller curving machine, so as to progressively curve the elongated piece from its initial configuration to a desired final shape represented by the stored profile of said at least one virtual template;

verifying step by step the geometry of said elongated pieces being processed through the following steps:

directly clicking on the real image reproduced on said viewing screen with a cursor of an aiming device to measure a geometric parameter of the elongated piece, dragging and/or rotating, in a working intermediate step, said at least one virtual template on a desired zone of the real image to superimpose a portion of said at least one virtual template on a respective portion of the elongated piece visible on the real image in the viewing screen and enlarging said desired zone of the real image to check the correct curvature of said respective portion of the elongated piece and to locally verify a geometric shape of said respective portion of the elongated piece being processed, and checking curvatures of further portions of the elongated piece, manually driving by the operator said roller curving machine based on the visual comparison in real time by the operator to align step by step subsequent portions of the profile of the elongated piece to the profile of said at least one virtual template of curvature stored in the processing unit.

2. Method according to claim 1, wherein the profile of said at least one virtual template of curvature is directly created by said control console, or it is provided to import a file that was previously created by a graphic software and store said file in, and call up from, a memory, and wherein it is provided to acquire a plurality of images in sequence, during the curving cycle.

3. Method according to claim 1, and further comprising the step of reproducing a plurality of progressive virtual templates, corresponding to subsequent intermediate curvature states of the elongated piece.

4. Method according to claim 1, wherein the profile of said at least one virtual template is a curved line having a single-radius or multi-radius curvature.

5. Method according to claim 1, and further comprising the step of orienting said camera unit so that a centreline plane of said camera unit coincides, in said operating position, with a vertical plane of symmetry of said rollers of said curving machine, so that the acquired images are centred on the main work area of said curving machine.

6. Computer product incorporated into a data support included in a digital system and comprising code portions to perform the method according to claim 1 when said computer product is run by said processing unit of said digital system.

7. Apparatus for controlling a process for curving an elongated piece, suitable for being installed on a roller curving machine, and configured for implementing the method according to claim 1, comprising:

a. a digital system that includes a control console provided with a programmable processing unit and with a viewing screen for simultaneously displaying data to enable an operator to manually drive said roller curving machine on the basis of said data, b. a camera unit, operationally connected to said processing unit, and configured and positioned for acquiring images of the elongated piece to be curved by said roller curving machine;

wherein said digital system is configured for inputting by said control console and storing in said processing unit the profile of at least one virtual template of curvature, and for reproducing on said viewing screen a real image of said elongated piece detected by said camera unit, wherein said real image is composed of a frame obtained by a video acquisition from said camera unit or of a photograph directly acquired by said camera unit, and wherein said processing unit is programmed to simultaneously graphically reproduce on said viewing screen the profile of said at least one virtual template of curvature superimposed on said real image of the elongated piece to be curved to enable the operator to manually compare the shape of the piece being processed with said virtual template of curvature superimposed on said viewing screen and, on the basis of a visual graphic comparison or measurement on said viewing screen to manually drive said roller curving machine to align the profile of the elongated piece with the profile of said virtual template of curvature stored in said processing unit, said control console including an aiming device having a cursor for directly clicking on the real image of the elongated piece reproduced on said viewing screen to measure a geometric parameter of the elongated piece, said digital system including a dragging and/or rotating function to move said at least one virtual template viewed on said viewing screen on a desired zone of the real image of the elongated piece to superimpose a portion of said at least one virtual template on a portion of the real image of the elongated piece and a zoom function to select and enlarge the desired zone of the real image of the elongated piece to locally verify a geometric shape of a determined portion of the elongated piece being processed and to check curvature of various portions of the elongated piece.

8. Apparatus according to claim 7, wherein said camera unit is placed at a higher position than a horizontal work plane on which said elongated piece to be curved lies and advances, said camera unit being supported by a horizontal arm that is in turn coupled with a vertical upright that is adapted to be coupled with said curving machine having vertical rollers.

9. Apparatus according to claim 8, wherein said camera unit is oriented according to an optical direction for image-acquisition that is substantially orthogonal to said work plane and parallel to the rotation axis of the rollers of said curving machine.

10. Apparatus according to claim 8, wherein said support arm is rotatably connected to said vertical upright so as to enable the movement of said camera unit from an operating position, wherein it aims at the work area, to a distancing position in which it facilitates the operations of loading and removing the elongated piece onto/from said curving machine.

11. Apparatus according to claim 10, further comprising one or more position sensors arranged for detecting the angular position of said support arm with respect to said vertical upright and controlling with precision that said operating position and said distancing position have been correctly reached.

12. Apparatus according to claim 10 wherein said support arm and said vertical upright are arranged so that a centreline plane of said camera unit coincides, in said operating position, with a vertical plane of symmetry of said rollers, so that the acquired images are centred on the main work area of said curving machine.

13. Apparatus according to claim 7, wherein said camera unit is placed at a distance from a vertical work plane on which said elongated piece to be curved lies and advances, said camera unit being supported by a turret that is fixable to or that can be lied on the ground, adapted to be oriented and faced towards said curving machine having horizontal rollers.

14. Apparatus according to claim 13, wherein said camera unit is oriented according to an optical direction for image-acquisition that is substantially orthogonal to said work plane and parallel to the rotation axis of the rollers of said curving machine.

15. Apparatus according to claim 7, wherein said control console is supported by a further support arm that extends as far as a front control zone intended for an operator, said further support arm being movable to enable the operations of loading/removal of the elongated piece onto/from said curving machine.

16. Apparatus according to claim 7, wherein said control console comprises a graphic interface of tactile type, a physical keyboard, and/or an aiming device.

17. Apparatus according to claim 7, wherein said control console comprises a computing apparatus in which said processing unit is provided, said computing apparatus including a memory into which a computer product is incorporated.

18. Roller curving machine, comprising three or more rollers for curving an elongated piece, and provided with the apparatus for controlling a curving process according to claim 7.

\* \* \* \* \*